3,051,740
ETHYLENICALLY UNSATURATED AROMATIC
PHOSPHORUS ACIDS
John G. Abramo, Albert Y. Garner, and Earl C. Chapin, Springfield, Mass., assignors to Monsanto Chemical Company, St. Louis, Mo., a corporation of Delaware
No Drawing. Filed Jan. 4, 1960, Ser. No. 16
5 Claims. (Cl. 260—461)

This invention is a continuation in part of that claimed in copending application S.N. 15, filed January 4, 1960. It relates to novel ethylenically unsaturated aromatic phosphorus compounds. More particularly, it relates to novel ethylenically unsaturated aromatic phosphorus acids.

The technology of phosphorus polymers has heretofore remained relatively undeveloped. However, these polymers are growing increasingly attractive for use in specialized applications wherein their novel properties may be advantageously utilized.

It is an object of this invention to provide novel phosphorus containing vinylidene monomers.

Another object is the provision of novel vinylidene aromatic monomers containing phosphorus acid groups and a process for their manufacture.

A further object is the provision of novel flame-resistant, water-soluble polymers.

These and other objects are attained by contacting a beta-haloalkyl halomethyl aromatic compound of a class as hereinafter described with an organophosphorus ester of a class as hereinafter described at a temperature of from 50–200° C. to form novel intermediates which are subsequently dehydrohalogenated in a polar solvent in the presence of an alkali metal base and hydrolyzed in an aqueous solution of a hydrolyzing agent.

The following examples are presented in illustration of the invention and are not intended as limitations thereon.

*Example I*

Seventy-five grams (about 0.4 mol) of para-(beta-chloroethyl) benzylchloride and 66 grams (about 0.4 mol) of triethyl phosphite are charged to a stirred reactor and heated at a temperature of about 90±5° C. for 20 hours. The resulting reaction mixture is vacuum distilled, yielding a fluid intermediate product boiling at about 185–190° C. at 3 mm. of mercury pressure. This intermediate product is identified by infrared and elemental analysis as diethyl para-(beta-chloroethyl) benzylphosphonate.

The intermediate is combined with 0.1 gram of tertiarybutyl catechol and a solution of 23 grams (about 0.4 mol) of potassium hydroxide dissolved in 500 ml. of ethanol in a second stirred reactor. This reaction mixture is heated at reflux (circa 78° C.) for 6 hours, then poured into water, extracted with benzene and then distilled to remove the benzene and residual water. The residue is vacuum distilled to yield a fluid product having a boiling point of about 120° C. at 0.2 mm. of mercury pressure. This compound is identified by infrared spectroscopy and elemental analysis as diethyl para-vinyl benzylphosphonate.

Twenty-five grams (about 0.1 mol) of this diethyl para-vinyl benzylphosphonate are charged to another stirred reactor together with 100 ml. of a 2% aqueous hydrochloric acid solution and 0.1 gram of tertiarybutyl catechol. The reaction mixture is heated at reflux (circa 100° C.) for 5 hours, then is evaporated to dryness under vacuum and extracted with hot acetone. On cooling the acetone phase, a crystalline product is obtained, which is identified by infrared spectroscopy, neutral equivalency, and elemental analysis as para-vinyl benzylphosphonic acid.

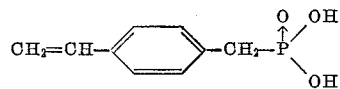

*Example II*

Twenty-five grams (about 0.1 mol) of the diethyl para-vinyl benzylphosphonate prepared in Example I are charged to a stirred reactor together with 4 grams (about 0.1 mol) of sodium hydroxide dissolved in 100 ml. of water and 0.1 gram of tertiarybutyl catechol. The reaction mixture is heated at reflux (circa 100° C.) for 2 hours, then is combined with 40 ml. of a 10% aqueous hydrochloric acid solution and subsequently evaporated to dryness under vacuum. The product is extracted from the solid residue with hot acetone. On cooling the acetone phase, a crystalline product is obtained, which is identified by infrared spectroscopy, neutral equivalency, and elemental analysis as the monoethyl ester of para-vinyl benzylphosphonic acid.

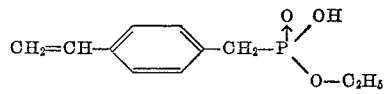

*Example III*

Twenty grams (about 0.1 mol) of para-(beta-chloroisopropyl) benzylchloride and 14 grams (about 0.1 mol) of diethyl methylphosphonite are charged to a stirred reactor and heated at a temperature of about 80±5° C. for 18 hours. The resulting reaction mixture is vacuum distilled, yielding a fluid intermediate product which is identified by infrared spectroscopy and elemental analysis as ethyl para-(beta-chloroisopropyl) benzyl methylphosphinate.

The intermediate is combined with 0.1 gram of tertiarybutyl catechol and a solution of 6 grams (about 0.1 mol) of potassium hydroxide dissolved in 500 ml. of ethanol in a second stirred reactor. This mixture is heated at reflux (circa 78° C.) for 6 hours, then poured into water, extracted with benzene, and then distilled to remove benzene and residual water. The residue is vacuum distilled to yield a fluid product which is identified by infrared spectroscopy and elemental analysis as ethyl para-isopropenyl benzyl methylphosphinate.

Twelve grams (about 0.05 mol) of this ethyl para-isopropenyl benzyl methylphosphinate are charged to another stirred reactor together with 75 ml. of a 2% aqueous hydrochloric acid solution and 0.05 gram of tertiarybutyl catechol. The reaction mixture is heated at reflux (circa 100° C.) for 5 hours, then is evaporated to dryness under vacuum and extracted with hot acetone. On cooling the acetone phase, a crystalline product is obtained, which is identified by infrared spectroscopy, neutral equivalency and elemental analysis as para-isopropenyl benzyl methylphosphinic acid.

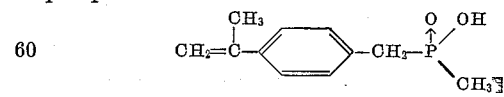

The beta-haloalkyl halomethyl aromatic compounds employed in the practice of this invention correspond to the general formula

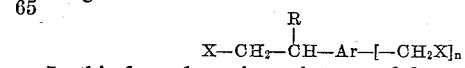

In this formula, $n$ is an integer of from 1–3, R may be either hydrogen or a methyl radical, each X is an independently selected halogen radical and Ar is a polyvalent aromatic residue containing from 6–14 carbon atoms and having a valency numerically equal to $n+1$.

Therefore, the para-(beta-chloroethyl) benzylchloride and the para-(beta-chloroisopropyl) benzylchloride employed in the examples, may be replaced, for example, with one of the following, with equivalent results: ortho-(beta-bromoethyl) benzylchloride, para-(beta-iodoethyl) benzylbromide, para-(beta - fluoroethyl) benzylchloride, meta-(beta-chloroisopropyl) benzylfluoride, 2 - (beta-chloroisopropyl) - 6 - chloromethyl naphthalene, 1-(beta-chloroethyl)-4-chloromethyl naphthalene, 1-(beta-chloroethyl)-4-chloromethyl naphthalene, 9-(beta-bromoethyl)-10-chloromethyl anthracene, 1-(beta - chloroethyl)-2,4-di(chloromethyl) benzene, 1 - (beta-bromoethyl) - 3,6 - di(chloromethyl) naphthalene, 2-(beta-chloroethyl) - 9,10-di(bromomethyl) anthracene, 1-(beta-chloroethyl)-2,4,6-tri(chloromethyl) benzene, 2-(beta-chloroethyl)-1,4,6-tri(chloromethyl) naphthalene, 9-(beta-chloroethyl)-3,6,10-tri(chloromethyl) anthracene, etc. Mixtures of such compounds may also be employed.

The organophosphorus esters employed in the practice of this invention are organic phosphonites and phosphites corresponding, respectively, to the following general formulae:

(a)
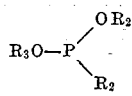

and (b)
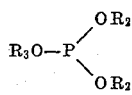

In each of these formulae, $R_3$ and each $R_2$ are independently selected hydrocarbon radicals containing from 1–20 carbon atoms. Therefore, the triphenyl phosphite and the diethyl methyl phosphonite employed in the examples, may be replaced, for example, with one of the following with equivalent results: a dialkyl methylphosphonite of the homologous series of from dimethyl methylphosphonite through dieicosyl methylphosphonite, a diisopropyl alkylphosphonite of the homologous series of from diisopropyl methylphosphonite through diisopropyl eicosylphosphonite, a dialkyl phenylphosphonite of the homologous series of from dimethyl phenylphosphonite through dieicosyl phenylphosphonite, diphenyl phenylphosphonite, diphenyl ethylphosphonite, ethyl methyl phenylphosphonite; a trialkyl phosphite of the homologous series of from trimethyl phosphite through trieicosyl phosphite, a methyl dialkyl phosphite of the homologous series of from methyl diethyl phosphite through methyl dieicosyl phosphite, an alkyl diphenyl phosphite of the homologous series of from methyl diphenyl phosphite through eicosyl diphenyl phosphite, ethyl methyl propyl phosphite, tritolyl phosphite, trinaphthyl phosphite, etc. Mixtures of such compounds may be employed if desired.

The novel ethylenically unsaturated aromatic phosphorus acids of this invention are prepared in an essentially 3-step process. In the first step, the beta-haloalkyl halomethyl aromatic compound and the organophosphorus ester, heretofore described, are co-reacted in substantially stoichiometric proportions at a temperature of from about 50–200° C. More particularly, at least 1 molar proportion of the organophosphorus compound is employed for each molar equivalent proportion ($n$) of halomethyl groups present in the beta-haloalkyl halomethyl aromatic compound. No solvent is required in this reaction. It is only necessary that at least one of the components be in a liquid state at the reaction temperature employed. An intermediate product corresponding to the general formula:

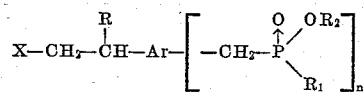

is obtained in this reaction. In this formula, $n$ is an integer of from 1–3, R is either a hydrogen or a methyl radical, X is a halogen radical, and Ar is a polyvalent aromatic residue as heretofore disclosed. $R_1$ corresponds to either an $R_2$ or an $OR_2$ radical as determined by the organophosphorus ester employed. This intermediate may be recovered from the reaction mixture in about 40–85% yield using conventional techniques, e.g., vacuum distillation, etc.

The intermediates obtained above are beta-haloalkyl aromatic phosphorus esters which may be further defined in terms of the organophosphorus compounds from which they are prepared. Thus, in various embodiments; organic phosphonites (Formula a, supra) may be employed to prepare beta-haloalkyl aromatic phosphinates corresponding to the general formula:

(a')
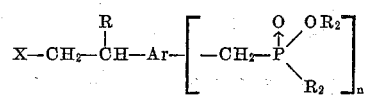

and organic phosphites (Formula b, supra) may be employed to prepare beta-haloalkyl aromatic phosphonates corresponding to the general formula:

(b')
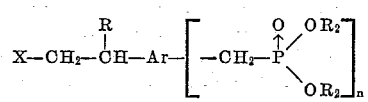

In the second step of this process, the intermediate product obtained above is dehydrohalogenated in a substantially anhydrous polar solvent at a temperature of from about 50–120° C., employing an alkali metal base as the dehydrohalogenating agent. At least 1 molar proportion of alkali metal base should be employed for each molar proportion of the intermediate. The ethylenically unsaturated aromatic phosphorus esters produced in this step should be recovered from the reaction mixture prior to the hydrolysis operation of the next step. This may be accomplished employing conventional techniques. For example, the reaction mixture may be extended with water and the ethylenically unsaturated aromatic phosphorus ester extracted from said aqueous solution with benzene, followed by distillation to remove low boiling constituents.

The third step of this process comprises hydrolysis of the ethylenically unsaturated phosphorus ester in an aqueous media at a temperature of from 80–150° C. employing a conventional hydrolyzing agent. Usually, the proportion of hydrolyzing agent employed should be at least stochiometrically equivalent to the number of ester groups contained in the ethylenically unsaturated aromatic phosphorus ester. However, in one embodiment of this invention, a proportion of hydrolyzing agent equivalent to substantially one-half the proportion of ester groups is employed in conjunction with the ethylenically unsaturated aromatic phosphorus diester (phosphonate) species.

Suitable alkali metal bases for use in this dehydrohalogenation step (2) include, for example, alkali metal hydrides such as sodium hydride, potassium hydride, cesium hydride, etc.; trialkyl amines such as triethyl amine, triisobutyl amine, etc.; alkali metal alkoxides such as sodium methoxide, potassium ethoxide, sodium dodecoxide, etc.; alkali metal phenolates such as sodium phenolate, etc.; alkali metal hydroxides such as lithium hydroxide, sodium hydroxide, potassium hydroxide, rubidium hydroxide or cesium hydroxide; quinoline; etc.

Conventional polar solvents may be employed in this dehydrohalogenation step (2). The solvents employed should be substantially anhydrous. Examples of suitable polar organic solvents include 1–20 carbon atom aliphatic alcohols such as methanol, ethanol, isopropanol, butanol, hexanol, eicosanol, etc.; dioxane; acetone; tetramethylenesulfone; tetrahydrofurane; etc. The 1–20 carbon atom alcohols form a preferred embodiment of this invention. It is especially desirable to use an alcohol corresponding to the general formula:

$$R_2\text{—OH}$$

in conjunction with reaction intermediates (from step 1) containing alkyl phosphorus ester groups. In such cases, the alcohol used should correspond to the alkyl group of the phosphorus ester, if possible, so as to preclude modification of the dehydrohalogenated product because of ester interchange. In another embodiment of this invention, however, the principle of ester interchange is advantageously utilized, using an alcohol containing a higher molecular weight alkyl group than that contained in the phosphorus ester to replace the lower alkyl group of said phosphorus ester. A lower alcohol comprised of the original alkyl group of said phosphorus ester is formed and may be removed by subsequent evaporation.

The third step of this process comprises hydrolysis of the ethylenically unsaturated aromatic phosphorus ester resulting from step 2. This is accomplished in aqueous solution at a temperature of from 80–150° C. employing a conventional hydrolyzing agent. Two types of hydrolyzing agents are commonly employed; mineral acids such as hydrochloric acid, hydrobromic acid, hydrofluoric acid, sulfuric acid, etc. and alkali metal hydroxides such as sodium hydroxide, lithium hydroxide, potassium hydroxide, cesium hydroxide, etc. The mineral acids catalyze the hydrolysis of the ester groups using water as the reactive component. Thus, if a mineral acid is employed, an excess of a 0.1–2% by weight aqueous solution of mineral acid should be used. The alkali metal hydroxide, on the other hand, reacts directly with the ester groups and thus, if this latter is employed instead of a mineral acid, such should be used in proportions at least stoichiometrically equivalent to the proportion of ester groups to be hydrolyzed.

In one embodiment of this invention, ethylenically unsaturated aromatic phosphorus diesters (phosphonates) are readily hydrolyzed in high yields to the corresponding half-ester by taking advantage of the lesser reactivity of the second ester group with alkali metal hydroxides. To attain this end, substantially equimolar proportions of an alkali metal hydroxide and an ethylenically unsaturated aromatic phosphonate are co-reacted.

When an alkali metal hydroxide is employed as the hydrolyzing agent, the desired ethylenically unsaturated aromatic phosphorus acid or half-ester is obtained in the form of the alkali metal salt. To convert the salt to the desired acid, at least a stoichiometric proportion of a mineral acid such as hydrochloric acid, etc. is combined with the final reaction mixture.

The final product may then be recovered from the aqueous reaction mixture resulting from step 3 employing conventional techniques. For example, the aqueous mixture may be evaporated to dryness under vacuum and the solid residue extracted with a hot substantially anhydrous polar organic solvent, e.g., acetone. On cooling this organic solvent phase, the desired product is precipitated as a purified product.

In a preferred embodiment, the dehydrohalogenation and the subsequent hydrolysis are effected in the presence of a minor proportion, e.g., from about 0.01–2% by weight, of a polymerization inhibitor. Conventional free radical scavengers such as ditertiarybutyl cresol, tertiarybutyl catechol, hydroquinone, phenylene diamine, sulfur, etc. may be employed in such function.

The novel ethylenically unsaturated aromatic phosphorus acids, prepared as heretofore described, may be broadly described as corresponding to the general formula:

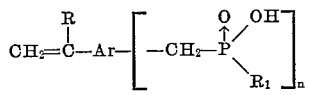

wherein $n$ is an integer of from 1–3, R is either a hydrogen or methyl radical, and Ar is a polyvalent aromatic residue as heretofore descrbied. $R_1$ is a radical selected from the group consisting of OH, $R_2$ and $OR_2$ radicals; said $R_2$ and $OR_2$ radicals having been heretofore disclosed as substituent groups on the initial organophosphorus ester.

Thus, in various embodiments of the overall process; organic phosphonites (Formula a, supra) may be employed to prepare ethylenically unsaturated aromatic phosphinic acids corresponding to the general formula:

(a″) 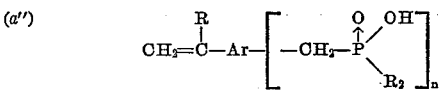

and organic phosphites (Formula b, supra) may be employed to prepare either half-esters of ethylenically unsaturated aromatic phosphonic acids corresponding to the general formula:

(b″₁) 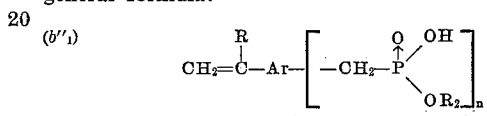

or ethylenically unsaturated aromatic phosphonic acids corresponding to the general formula:

(b″₂) 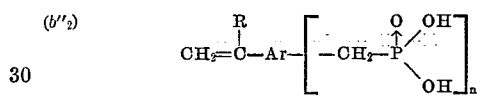

The products of this invention are hydroscopic crystalline solids. As a class, these compounds have been found to be flame-resistant. Thus, in one application, they may be interpolymerized, in minor proportions, with other vinyl or vinylidene monomers, e.g., styrene, acrylic esters, acrylonitrile, etc., to provide novel flame-resistant polymers. However, these compounds may also be homopolymerized to provide novel water-soluble, flame-resistant polymers. Such polymers may be cast as flame-resistant surface coatings or laminates on, e.g., wood, glass, metal, refractories, etc. They may also be used as impregnants to impart flame-resistance to, e.g., textile fabrics, paper, etc.

*Example IV*

Fifteen grams of the para-vinyl benzylphosphonic acid prepared in Example I and 0.1 gram of ditertiarybutyl peroxide are charged to a reaction tube and placed under an inert atmosphere. The reaction mixture is heated at about 80° C. for 15 hours to produce a hard, transparent polymer which is found by infrared spectroscopy and elemental analysis to be comprised of a plurality of recurring structural units of the formula:

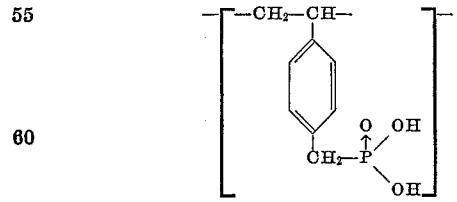

*Example V*

A 10 gram skein of wool is immersed in 500 ml. of a 10% by weight aqueous solution of the para-vinyl benzylphosphonic acid polymer prepared in Example IV for 1 hour at a temperature of 80° C. The treated skein is then dried in a hot-air oven at 110° C. for 2 hours. Testing for flammability by holding the wool skein vertically in the flame of a Meeker burner until it is ignited, the wool skein is found to be self-extinguishing.

It is obvious that many variations may be made in the products and processes set forth above without departing from the spirit and scope of this invention.

What is claimed is:
1. An ethylenically unsaturated aromatic phosphorus acid corresponding to the general formula:

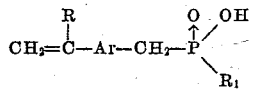

wherein R is a radical selected from the group consisting of hydrogen and methyl, Ar is a divalent aromatic residue containing from 6–14 carbon atoms, and $R_1$ is a radical selected from the group consisting of OH, $R_2$ and $OR_2$ radicals, wherein, in turn, $R_2$ is a hydrocarbon radical containing from 1–20 carbon atoms.

2. Vinyl benzylphosphonic acid.
3. Monethyl ester of vinyl benzylphosphonic acid.
4. Isopropenyl benzyl methylphosphinic acid.
5. A process for preparing an ethylenically unsaturated aromatic phosphorus acid corresponding to the general formula:

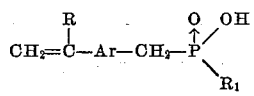

which comprises (1) contacting 1 molar proportion of a beta-haloalkyl halomethyl aromatic compound corresponding to the general formula:

with substantially 1 molar proportion of an organophosphorus compound corresponding to a general formula selected from the group consisting of (a)

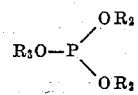

and (b)

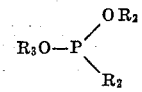

at a temperature of from about 50–200° C., (2) contacting the product of step (1) with at least an equimolar proportion of an alkali metal base in a substantially anhydrous polar solvent at a temperature of from about 50–120° C., and (3) subsequently contacting the product of step (2) with an aqueous solution of a hydrolyzing agent at a temperature of from about 80–150° C.; wherein, in each of the above formulae, each X is a halogen radical, R is a radical selected from the group consisting of hydrogen and methyl, Ar is a divalent aromatic residue containing from 6–14 carbon atoms and $R_1$ is a radical selected from the group consisting of OH, $R_2$ and $OR_2$ radicals, wherein, in turn, $R_2$ is a hydrocarbon radical containing from 1–20 carbon atoms.

No references cited.